United States Patent Office 2,712,492
Patented July 5, 1955

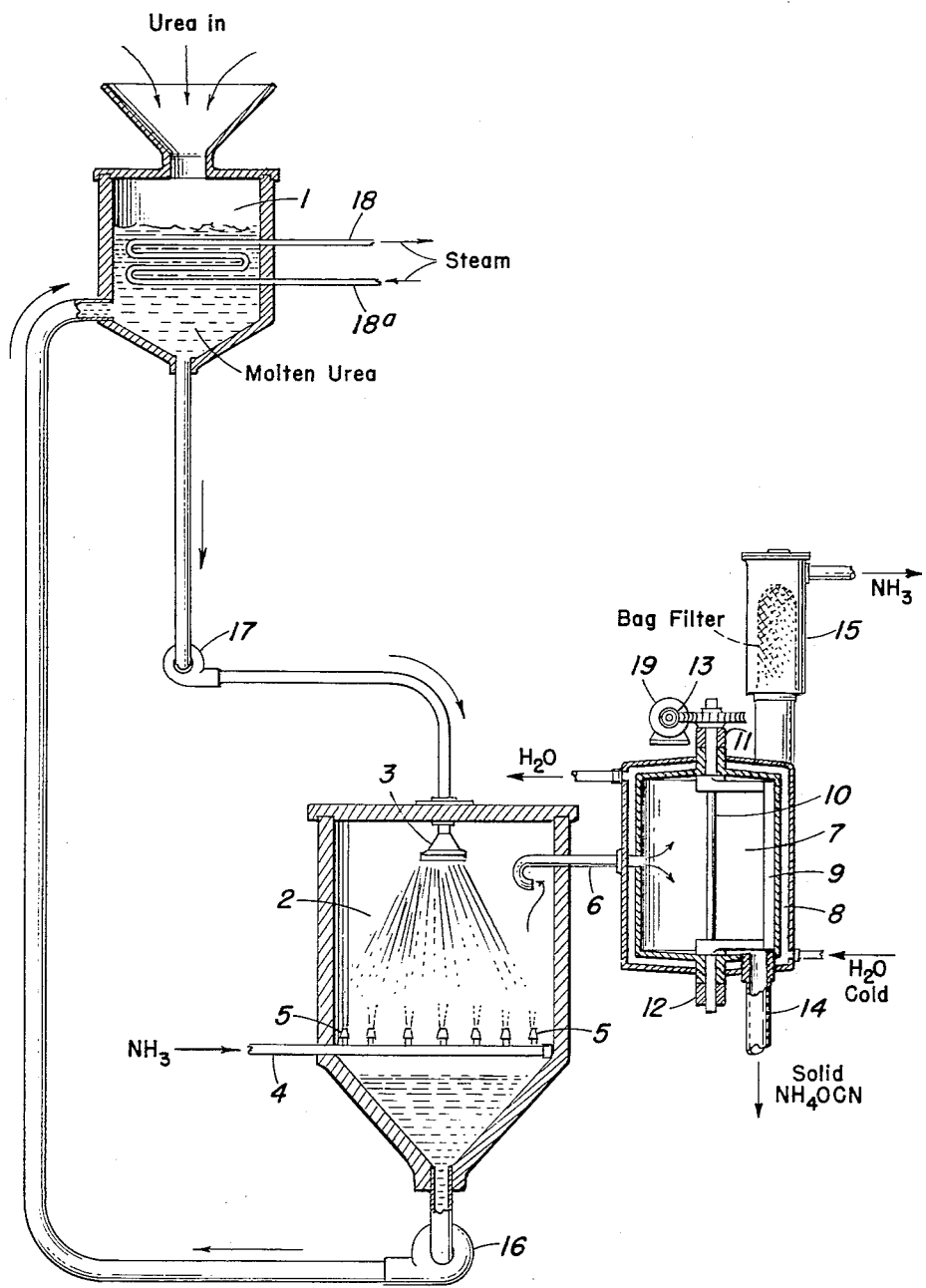

2,712,492

METHOD OF PREPARING AMMONIUM CYANATE

Johnstone S. Mackay, Pittsburgh, Pa., and Kenneth A. Sund, Glenbrook, Conn., assignors to American Cyanamid Company, New York, N. Y., a corporation of Maine Application April 14, 1954, Serial No. 423,154

5 Claims. (Cl. 23—75)

This invention relates to a method of preparing ammonium cyanate. More particularly it relates to a method of preparing ammonium cyanate from urea and specifically it is concerned with the preparation of ammonium cyanate from molten urea.

It has been long known that ammonium cyanate may be produced by the sublimation of urea. If urea is heated sufficiently beyond its melting point to cause partial vaporization, the vapors that form in the initial stages of heating are known to condense to form ammonium cyanate, among other compounds. However, the yields of ammonium cyanate are exceedingly small due to the formation of other products. Accordingly, the art has been repeatedly explored for a good commercial process for the manufacture of ammonium cyanate of good quality and in good yield by simply heating urea. To the present, there has been no satisfactory method for accomplishing this result. This is not surprising because urea behaves in a peculiar fashion when it is heated.

As is well known, urea which is the amide of carbamic acid, melts at about 132° C. When the temperature is increased above its melting point, urea begins to vaporize. However, the vaporization is complex and results in transformations to many compounds. Initially, the molten urea begins to lose ammonia. As a result of the ammonia being driven off, there remains along with residual urea such compounds as biuret, triuret, cyanuric acid, ammeline, ammelide, and other deaminated products. Traces of carbon dioxide will also be found in the ammonia initially liberated on heating a mass of urea slowly at just above its melting point. On continued heating, and particularly if the temperature is increased to about 150° C. to 200° C., a part of the vapors can be condensed to yield small amounts of impure ammonium cyanate. However, the vapors soon change their characteristics so that ammonium cyanate can no longer be condensed. Even in condensing the initial vapors, it has been found that the sublimed solids are found to consist largely of urea. Cyanuric acid is the only known compound that has been successfully isolated in substantially pure form as a result of heating urea.

It is an object of the present invention to overcome these difficulties. In effecting this result, it is desired to obtain ammonium cyanate of good quality from the vapors of molten urea in a high yield hitherto unobtainable.

According to this invention, it has been found that ammonium cyanate of good quality and in good yield can be readily obtained by spraying molten urea, countercurrently contacting the sprayed urea with preheated ammonia, rapidly removing the vapors thus formed, condensing the vapors and recovering the thus-formed ammonium cyanate.

The invention contemplates further the stabilization of urea by means of a preheated ammonia atmosphere in a contact reactor. In this way, only minute quantities of deamination products are formed. Any unreacted urea which is not volatilized in the reactor is collected and recycled for further use in the process. Additionally, the unreacted urea is an excellent vehicle for any of the deamination products that are formed. As the urea is recycled in the process, the deamination products may ultimately be converted to ammonium cyanate upon contact with ammonia.

It has been found that the efficiency of the process of the invention resides in the fact that the heat required for vaporization is imparted to small droplets of molten urea in the presence of a very large proportion of preheated ammonia gas, so that vaporization is achieved rapidly and without formation of large amounts of deaminated products. As a result, the yield of ammonium cyanate is on the order of 90%, based on the weight of urea consumed or converted. Since ammonium cyanate is not at present a chemical of commerce, the process of the invention makes it now a reality.

The invention will be further described with reference to the accompanying drawing, the single figure of which is a flow sheet wherein an ammonium cyanate plant embodying the principal features of the invention is diagrammatically illustrated.

Referring to the drawing, urea is introduced into a feed tank 1, heated by means of steam heating coils 18 and 18a to a temperature above its melting point, preferably in the range of from 132° C. to 175° C. As soon as urea is molten, it is pumped by means of a feed pump 17 to a contact reactor 2 and sprayed through a nozzle 3. The sprayed urea droplets are contacted countercurrently with preheated ammonia, which is introduced through a conduit 4 and released through a plurality of nozzles 5. Of course, any mechanical means known to the art may be employed to introduce a preheated stream of ammonia in a countercurrent fashion. The temperature of the preheated ammonia may range between about 150° C. to 450° C., and preferably between about 275° C. to 400° C.

The vapors issuing from the reactor 2 are swept into a conduit 6, located in the upper portion of the reactor 2, which permits the vapors to be led into a condenser 7, maintained at a temperature between 0° C. to 75° C. by means of a water-cooled jacket 8 provided with a water inlet and outlet. The vapors are condensed on the walls of condenser 7 and scraped off by means of scraper 9. The scraper is mounted to a shaft 10 which extends through the condenser 7. The shaft 10 is extended through a housing 11 and 12 which provides it with lubrication. A worm gear 13 is attached to shaft 10. That gear is mounted to a motor 13 or any suitable means to activate the scraper in the condenser 7. The shaft rotates so that the condensed vapor is scraped off the condenser walls and deposited in a sump 14 and collected. Any excess ammonia vapor passes through a bag filter 15. It is collected and recycled by any convenient means to the reactor 2. Prior to use, the ammonia is, of course, reheated to the required temperature by means of a preheater of the conventional type (not shown).

The molten urea in the contact reactor 2 which is not vaporized, collects in the bottom of the contact reactor 2 and is then pumped by means of pump 16 to the feed tank 1. The molten urea is then reused in the process.

While the process as above described is operative under atmospheric pressure, it may be carried out under a positive pressure up to about 175 pounds per square inch gauge, and advantageously from 50 to 150 pounds per square inch.

As a further aid in understanding the process of the present invention, the following examples are given by way of illustration and not of limitation.

Example 1

60 pounds of urea is added to a feed tank having a 100 pound capacity and heated to 150° C. until molten. A feed pump is set to introduce a flow of 40 pounds per hour of the molten urea through a sprayer. The molten urea is then sprayed into a reactor. The urea droplets are contacted countercurrently with preheated ammonia, introduced at a temperature of 400° C. The molten droplets of urea which are so contacted are at least partially vaporized and the resulting vapor mixture is drawn off continuously. It is observed that the temperature of the exit vapors is approximately 300° C. These vapors are then condensed in a cooling zone maintained at a temperature of about 25° C. The condensed product which is ammonium cyanate is scraped off the walls of the cooling zone and excess ammonia vapors are collected and recycled to a preheater, whereby the vapors are reheated to 400° C., and reintroduced to the reactor. The amount of preheated ammonia entering the reactor is 300 pounds per hour. The unvaporized molten urea is collected in the reactor and recycled to the feed tank for further processing. At the end of one hour of operation, 20 pounds of urea had been consumed. However, 18 pounds of ammonium cyanate, corresponding to 90% based on the urea consumed, was recovered from the condenser.

Example 2

Example 1 is repeated except that the process of that example is carried out continuously for ten hours, during which time sufficient urea is added to the feed tank to provide for a throughput of 40 pounds per hour. At the end of 10 hours of operation, 195 pounds of urea had been consumed. The amount of ammonium cyanate collected in the condenser is 188 pounds, corresponding to 95% based on the urea consumed.

Example 3

The process of Example 1 is repeated except that the temperature of the preheated ammonia employed to contact the molten droplets of urea is 325° C. A positive pressure of 50 pounds per square inch gauge is maintained throughout the system. At the end of one hour of operation, 19.5 pounds of urea had been consumed. 17.9 pounds of ammonium cyanate are recovered in the reactor, which corresponds to 92% based on the urea consumed.

While in the preceding examples, the ratio of contacted urea to ammonia is 1:7.5, a good operating range, depending upon the temperature of the ammonia, is from about 1:5 to 1:20 based upon their respective weights. In general, where the temperature of ammonia approaches 450° C., a smaller ratio of ammonia to urea is required. Conversely, where the temperature of ammonia approaches 150° C., a larger ratio of ammonia to urea will be required to effect the desired conversion to ammonium cyanate in good yield and quality.

We claim:

1. The method of preparing ammonium cyanate which comprises heating urea until molten in a vessel; continuously spraying said molten urea into a reaction zone; countercurrently contacting it with preheated ammonia gas, said ammonia being introduced into the reaction zone at a temperature of at least about 150° C. whereby at least a portion of the urea is vaporized; collecting and recycling any unvaporized molten urea in and from said reaction zone to said vessel; withdrawing from the reaction zone resultant vapors and ammonia gas to a cooling zone maintained at a temperature below about 75° C.; condensing said vapors in the latter zone; and recovering ammonium cyanate from said cooling zone.

2. The method according to claim 1 in which the preheated ammonia is introduced at a temperature between 275° C. and 400° C.

3. The method of claim 1 in which the process is carried out at superatmospheric pressures of below about 175 p. s. i. g.

4. The method of preparing ammonium cyanate which comprises heating urea until molten in a vessel; continuously spraying said molten urea into a reaction zone; countercurrently contacting it with preheated ammonia gas introduced into said reaction zone at a temperature between about 300° C. and 400° C. whereby at least a portion of the urea is vaporized; collecting and recycling any unvaporized molten urea in and from said reaction zone to said vessel; withdrawing from the reaction zone resultant vapors and ammonia gas to a cooling zone maintained at a temperature between about 0° C. and 75° C.; condensing said vapors in the latter zone; and recovering ammonium cyanate from said cooling zone.

5. The method according to claim 4 in which the ammonium cyanate vapor is condensed at about 25° C.

References Cited in the file of this patent

Williams: "Cyanogen Compounds," 2d ed., 1948, pages 48, 49, 72 and 73.

Mixter: "Am. Chem. Journ.," vol. IV (1882–38), pages 35–38.

Dirnhuber et al.: "Chem. Abstracts," vol. 43 (1949), col. 143, C. A. cites Biochem. J., vol. 42, pages 628–32, (1948).